(12) United States Patent
Swoish et al.

(10) Patent No.: US 9,206,719 B2
(45) Date of Patent: Dec. 8, 2015

(54) ENHANCED CRT ENABLEMENT BASED ON SOOT MASS STORED IN PARTICULATE FILTER

(71) Applicant: GM Global Technology Operations LLC, Detroit, MI (US)

(72) Inventors: Christopher C. Swoish, Lapeer, MI (US); Douglas Christopher Sarsen, Howell, MI (US); Christopher Whitt, Howell, MI (US); Thomas Larose, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

(21) Appl. No.: 14/022,871

(22) Filed: Sep. 10, 2013

(65) Prior Publication Data

US 2015/0068192 A1 Mar. 12, 2015

(51) Int. Cl.
| | |
|---|---|
| F01N 3/00 | (2006.01) |
| F01N 3/023 | (2006.01) |
| F01N 3/10 | (2006.01) |
| F01N 3/20 | (2006.01) |
| F02D 41/02 | (2006.01) |
| F01N 9/00 | (2006.01) |
| F01N 13/00 | (2010.01) |
| F02D 41/14 | (2006.01) |

(52) U.S. Cl.
CPC .............. *F01N 3/023* (2013.01); *F01N 3/0231* (2013.01); *F01N 3/106* (2013.01); *F01N 3/2066* (2013.01); *F01N 9/002* (2013.01); *F01N 13/009* (2014.06); *F02D 41/029* (2013.01); *F02D 41/1461* (2013.01); *F02D 41/1467* (2013.01); *F01N 2560/026* (2013.01); *F01N 2900/1402* (2013.01); *F01N 2900/1606* (2013.01); *F02D 2200/0812* (2013.01)

(58) Field of Classification Search
CPC ......... F01N 3/023; F01N 3/021; F01N 9/002; F01N 2900/1606; F01N 2900/1611; F01N 3/0231; F01N 3/2066; F01N 3/106; F02D 41/029; F02D 41/1467; F02D 41/1461
USPC .................................................... 60/272–324
See application file for complete search history.

(56) References Cited

U.S. PATENT DOCUMENTS

| | | | |
|---|---|---|---|
| 2011/0209460 A1* | 9/2011 | He et al. ........................ | 60/274 |
| 2011/0257899 A1* | 10/2011 | Zanetti et al. ................. | 702/24 |
| 2012/0124966 A1* | 5/2012 | Krueger ........................ | 60/274 |

* cited by examiner

*Primary Examiner* — Thomas Denion
*Assistant Examiner* — Kelsey Stanek
(74) *Attorney, Agent, or Firm* — Cantor Colburn LLP

(57) ABSTRACT

An exhaust treatment system to treat exhaust gas includes a particulate filter and a pressure sensor. The particulate filter is configured to trap soot contained in exhaust gas. The pressure sensor is configured to output a pressure signal indicative of a pressure differential of the particulate filter. The exhaust treatment system further includes a soot mass module configured to determine a soot mass. The soot mass is indicative of an amount of soot stored in the particulate filter based on the pressure differential and a soot model stored in a memory device. The exhaust treatment system further includes a continuously regenerating trap (CRT) compensation module configured to generate a variable CRT threshold. The CRT compensation module selectively outputs a CRT compensation value that modifies the soot model based on comparison between the NOx flow rate and the soot mass-based variable CRT threshold.

16 Claims, 2 Drawing Sheets

ENHANCED CRT ENABLEMENT BASED ON SOOT MASS STORED IN PARTICULATE FILTER

FIELD OF THE INVENTION

The present disclosure relates to exhaust treatment systems, and more particularly to, estimating soot mass stored on an after-treatment device of an exhaust treatment system.

BACKGROUND

Vehicle exhaust treatment systems are used to reduce undesired emissions, such as oxides of nitrogen ($NO_x$) and particulate matter (e.g., soot) output by the vehicle engine. The vehicle exhaust systems typically include a particulate filter ("PF"), which traps the soot from the exhaust gas generated by the engine. The PF may include one or more filter substrates that define a plurality of apertures, through which the exhaust gas must flow. The particulate matter collects on the filter substrate as the exhaust gas flows through the apertures. A regeneration operation may be performed to burn away the collected particulate matter and regenerate the PF. The regeneration operation heats the particulate filter to a combustion temperature sufficient to combust (i.e., burn) the collected particulate matter.

One or more regeneration events for initiating the regeneration operation may be determined according to a soot model. The soot model may be used to estimate and predict soot accumulation on the particulate filter, which may indicate the desirability to perform the regeneration operation. However, changes in the temperature at which an engine operates can cause appreciable variations in quantities of soot carried in the engine exhaust stream. Conventional exhaust treatment systems have attempted to compensate for variations in the quantity of soot loading during low operating conditions, such as urban driving condition, by applying a single non-varying (i.e., static) continuously regenerating trap (CRT) correction factor to the soot model based on $NO_x$ levels in the exhaust gas.

SUMMARY OF THE INVENTION

In one exemplary embodiment of the present disclosure, an exhaust treatment system to treat exhaust gas includes a particulate filter and a pressure sensor. The particulate filter is configured to trap soot contained in exhaust gas. The pressure sensor is configured to output a pressure signal indicative of a pressure differential of the particulate filter. The exhaust treatment system further includes a soot mass module configured to determine a soot mass. The soot mass is indicative of an amount of soot stored in the particulate filter based on the pressure differential and a soot model stored in a memory device. The exhaust treatment system further includes a continuously regenerating trap (CRT) compensation module configured to generate a variable CRT threshold and to selectively output a CRT compensation value that modifies the soot model based on a comparison between the NOx flow rate and the soot mass-based variable CRT threshold.

In another exemplary embodiment of the disclosure, a hardware control module is configured to dynamically modify a soot model that indicates a soot mass stored on a particulate filter. The hardware control module comprises a memory device, a soot mass module and a continuously regenerating trap (CRT) compensation module. The memory device is configured to store the soot model. The soot mass module is configured to determine the soot mass based on the soot model and a pressure differential between an inlet and an outlet of the particulate filter. The CRT compensation module is in electrical communication with the soot mass module. The CRT module is configured to generate a CRT compensation value that modifies the soot model. The CRT module is further configured to generate a CRT threshold that varies as the soot mass stored in the particulate filter changes.

In yet another exemplary embodiment of the disclosure, a method of controlling an exhaust treatment system of a vehicle comprises trapping soot contained in exhaust gas flowing through a particulate filter. The method includes determining a pressure differential between an inlet of the particulate filter and an outlet of the particulate filter. The method further includes determining a soot mass indicative of an amount of soot stored in the particulate filter based on the pressure differential and a soot model. The method further includes generating a CRT compensation value and a variable CRT threshold. The method further includes comparing the NOx level to the variable CRT threshold and selectively applying the CRT compensation value to the soot model such that the soot model is modified based on the comparison.

The above features of the present disclosure are readily apparent from the following detailed description when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
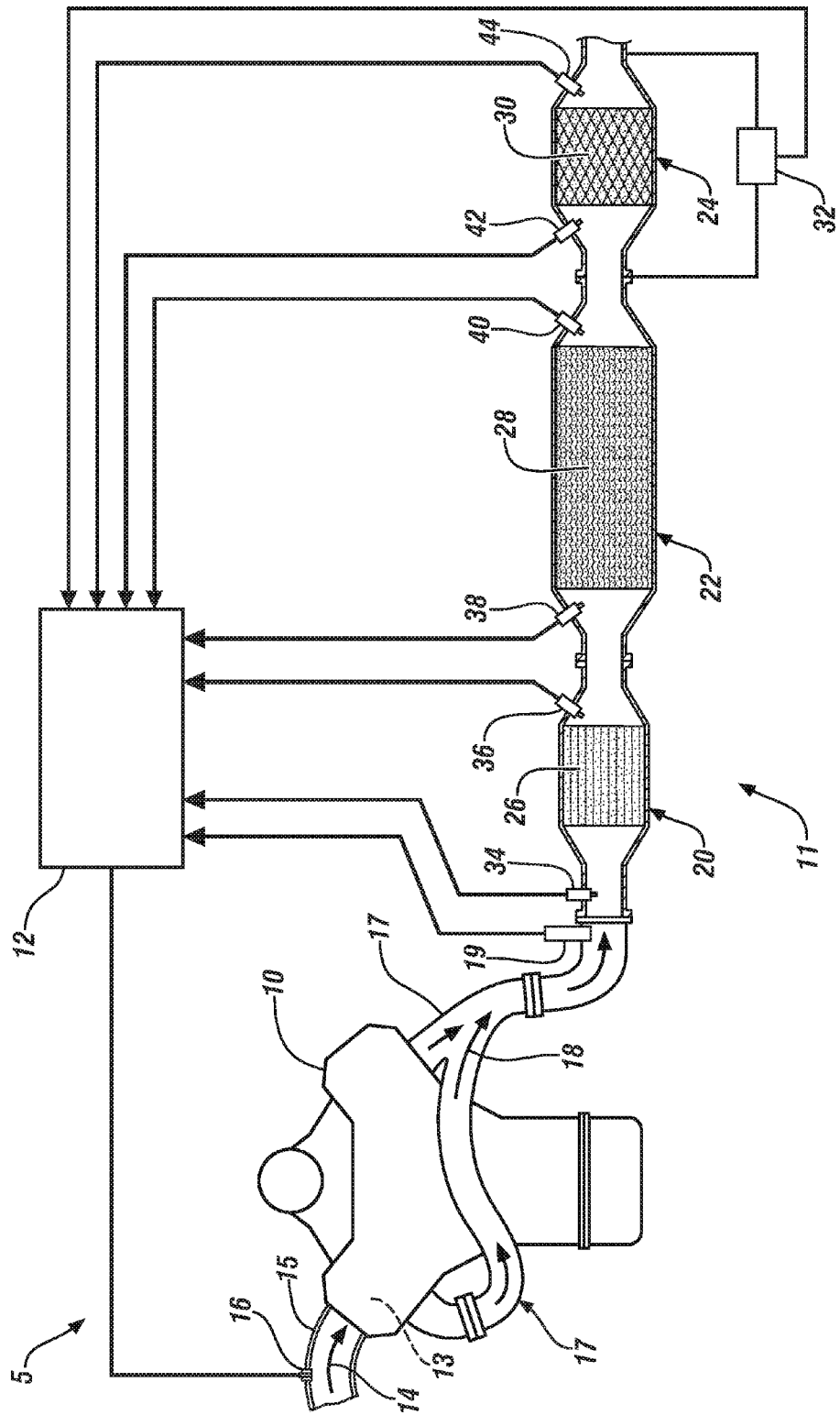
FIG. 1 is a schematic diagram of a vehicle system including an exhaust treatment system having a vehicle control module that dynamically modifies a soot model for determining soot mass of a particulate filter according to an embodiment of the present disclosure.

The following description is merely exemplary in nature and is not intended to limit the present disclosure, its application or uses. It should be understood that throughout the drawings, corresponding reference numerals indicate like or corresponding parts and features.

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality. In at least one embodiment of the present disclosure, a module may include a microcontroller as understood by those ordinarily skilled in the art.

Referring now to FIG. 1, a vehicle system 5 is generally shown according to an embodiment of the present disclosure. The vehicle system 5 includes an internal combustion (IC) engine 10, an exhaust gas treatment system 11, and a vehicle control module 12. The engine 10 may include, but is not limited to, a diesel engine, gasoline engine, and a homogeneous charge compression ignition engine. The engine 10 includes at least one cylinder 13 configured to receive fuel, and intake air 14 from an air intake passage 15. The air intake passage 15 includes a mass air flow (MAF) sensor 16 to determine an intake air mass ($m_{Air}$) of the engine 10. In one embodiment, the MAF sensor 16 may include either a vane meter or a hot wire type intake mass air flow sensor. However, it is appreciated that other types of sensors may be used as well. An exhaust gas conduit 17 may convey exhaust gas 18 that is generated in response to combusting the fuel and air 14 in the cylinder 13. The exhaust gas conduit 17 may include one or more segments containing one or more aftertreatment devices of the exhaust gas treatment system 11, as discussed in greater detail below. A $NO_x$ sensor 19 may disposed downstream from the engine 10 to determine an amount of $NO_x$ (e.g. $NOx_{MASS}$) present in the exhaust gas 18 and/or a $NO_x$ flow rate (e.g., $NO_{xRATE}$).

The exhaust gas treatment system 11 described herein can be utilized with any of the engine systems described above to reduce exhaust gas constituents generated during combustion. The exhaust gas treatment system 11 generally includes one or more exhaust treatment devices. The exhaust treatment devices include, but are not limited to, an oxidation catalyst device ("OC") 20, and a selective catalytic reduction ("SCR") device 22, and a particulate filter ("PF") 24. In at least one exemplary embodiment of the disclosure, the PF 24 is a diesel particulate filter. As can be appreciated, the exhaust gas treatment system 11 of the present disclosure may include various combinations of one or more of the exhaust treatment devices shown in FIG. 1, and/or other exhaust treatment devices (not shown) and is not limited to the present example. For example, an individual PF 24 may be disposed downstream from a separate SCR device 22.

In FIG. 1, the exhaust gas conduit 17, which may comprise several segments, transports exhaust gas 18 from the engine 10 to the various exhaust treatment devices 20, 22, 24 of the exhaust gas treatment system 11. As can be appreciated, the OC 20 can be of various flow-through, oxidation catalyst devices known in the art. In various embodiments the OC 20 may include a flow-through metal or ceramic monolith substrate 26 that is wrapped in an intumescent mat or other suitable support that expands when heated, securing and insulating the substrate. The substrate 26 may be packaged in a stainless steel shell or canister having an inlet and an outlet in fluid communication with the exhaust gas conduit 17. The substrate 26 can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 20 is useful in treating unburned gaseous HC and CO, which are oxidized to form carbon dioxide and water.

The SCR device 22 may be disposed downstream of the OC 20, and is configured to reduce $NO_x$ constituents in the exhaust gas. As can be appreciated, the SCR device 22 may be constructed of various materials known in the art. In various embodiments, the SCR device 22 includes an SCR substrate 28. A SCR catalyst composition (e.g., a SCR washcoat) may be applied to the SCR substrate 28. The SCR device 22 may utilize a reductant, such as ammonia ($NH_3$) to reduce the $NO_x$. More specifically, the SCR device 22 catalyst composition can contain a zeolite and one or more base metal components such as iron (Fe), cobalt (Co), copper (Cu) or vanadium (V) which can operate efficiently to convert $NO_x$ constituents in the exhaust gas in the presence of $NH_3$. The reductant utilized by the SCR device 22 may be in the form of a gas, a liquid, or an aqueous urea solution and may be mixed with air to aid in the dispersion of an injected spray generated by a reductant supply system as known to those ordinarily skilled in the art.

The PF 24 may be disposed downstream from the SCR device 22, and filters the exhaust gas 18 of carbon and other particulate matter (e.g., soot). The PF 24 has an inlet and an outlet in fluid communication with exhaust gas conduit 17 to convey exhaust gas 18 therethrough. According to at least one exemplary embodiment, the PF 24 may be constructed using a ceramic wall flow monolith exhaust gas filter substrate 30 that is wrapped in an intumescent or non-intumescent material (not shown). The filter substrate 30 may expand when heated to secure and insulate the filter substrate 30 which is packaged in a rigid, heat resistant shell or canister. It is appreciated that the ceramic wall flow monolith filter substrate 30 is merely exemplary in nature and that the PF 24 may include other filter devices such as wound or packed fiber filters, open cell foams, sintered metal fibers, etc. The exhaust gas treatment system 11 may perform a regeneration operation that regenerates the PF 24 by burning off the particulate matter trapped in the filter substrate 30. Various systems known to those ordinarily skilled in the art (e.g., active regeneration systems and/or passive regeneration systems) may be used for performing the regeneration operation to regenerate the PF 24.

The exhaust gas treatment system 11 may further include at least one pressure sensor 32 (e.g., a delta pressure sensor), as illustrated in FIG. 1. The delta pressure sensor 32 may determine the pressure differential (i.e., $\Delta p$) across the PF 24 (e.g., between the PF inlet and the PF outlet). Although a single delta pressure sensor 32 is illustrated, it is appreciated that a plurality of pressure sensors may be used to determine $\Delta p$. For example, a first pressure sensor may be disposed at the inlet of the PF 24 and a second pressure sensor may be disposed at the outlet of the PF 24. Accordingly, the difference between the pressure detected by the second delta pressure sensor and the pressure detected by the first delta pressure sensor may indicate the $\Delta p$ of the PF 24.

In addition to pressure sensors, the exhaust gas treatment system 11 may include one or more temperature sensors. According to at least one exemplary embodiment of the present disclosure, the exhaust gas treatment system 11 may include temperature sensors 34-44. Although six temperature sensors are described, the number of temperature sensors illustrated in FIG. 1, however, is not limited thereto. First temperature sensor 34 and second temperature sensor 36 are disposed at the inlet and outlet of the OC 20, respectively, and may determine a temperature of the OC substrate 26. Third temperature sensor 38 and fourth temperature sensor 40 are disposed at the inlet and outlet of the SCR device 22, respectively, and may determine a temperature of the SCR device 22. Fifth temperature sensor 42 and sixth temperature sensor 44 are disposed at the inlet and outlet of the PF 24, respectively, and may determine a temperature of the filter substrate 30.

The vehicle control module 12 controls one or more operations of the engine 10 and/or the exhaust gas treatment system 11 based on measurements provided by one or more sensors and/or operating models. According to at least one exemplary embodiment, the vehicle control module 12 may control the regeneration operation, which regenerates the PF 24 when a regeneration event occurs. The regeneration operation heats the particulate filter 30 to a temperature sufficient to combust (i.e., burn) the collected soot.

One or more regeneration events may trigger the regeneration operation. The vehicle control module 12 may determine a regeneration event according to a soot model stored in a memory device. The soot model may be used to estimate and predict the amount (i.e., mass) of soot accumulated by the filter substrate 30 of the PF 24. The mass of accumulated soot may be set as a basis for performing the regeneration operation. According to at least one exemplary embodiment, the soot model is based on $\Delta p$, a temperature of the filter substrate 30 (Ts), $NO_{xRATE}$, and an exhaust gas volume flow rate (dvol). The dvol may be determined using $m_{Air}$ measured by the MAF sensor 16 and an amount of fuel injected into the cylinders 13 as known by those ordinarily skilled in the art. It is appreciated that the soot model described above is not limited to the aforementioned measurements and additional operating parameters may be taken into account.

In addition to controlling the regeneration option according to the soot model, the vehicle control module 12 determines a compensation value (hereinafter referred to as a CRT compensation value) that is applied to the soot model to compensate for variations in $\Delta p$ for a given soot loading during operation of the engine 10. Conventional CRT compensation systems utilize only the amount of $NO_x$ or the $NO_x$ flow rate to determine when to apply correction factor to the soot model. The conventional correction factor is then calibrated (i.e., applied) according to a single low-level scalar $NO_x$ threshold, above which the model applies the same level of compensation to the soot loading for all levels of NOx present in the PF 24. Accordingly, the soot model is conventionally corrected based only on the $NO_x$ concentration or NOx flow rate of the exhaust gas 18.

The vehicle control module 12 according to the present disclosure generates a CRT compensation value based on the amount of soot (i.e., soot mass) accumulated in the filter substrate 30 of the PF 24. Moreover, unlike the conventional CRT correction factor, which is a single static (i.e., non-varying) scalar value, the vehicle control module 12 executes a dynamic CRT enablement operation for modifying the soot model to compensate for variations in soot loading cause by changes in $\Delta p$ of the PF 24. More specifically, the vehicle control module 12 generates a varying CRT threshold, which varies as the soot mass accumulated in the filter substrate 30 changes. Accordingly, the CRT compensation value is selectively applied in a variable manner as the soot mass accumulated in the filter substrate 30 changes. That is, the vehicle control module 12 enables the CRT compensation as a function of soot mass, as opposed to a single scalar $NO_x$ threshold. As a result, the accuracy and precision of the soot model may be improved, and premature regeneration of the PF 24 may be avoided.

Figure 2:
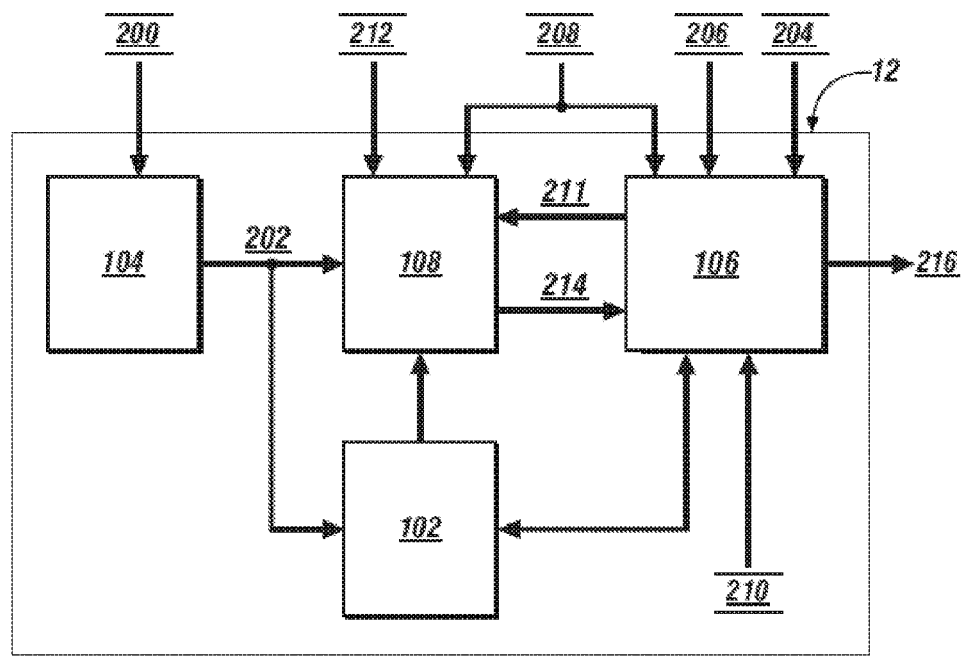
FIG. 2 is a block diagram illustrating a control module that modifies a soot model based on a dynamic CRT enablement operation according to an embodiment of the present disclosure.

Turning now to FIG. 2, a block diagram illustrates a vehicle control module 12 that modifies a soot model based on a dynamic CRT enablement operation according to an embodiment of the present disclosure. Various embodiments of the vehicle system 5 may include any number of sub-modules embedded within the vehicle control module 12. As can be appreciated, the sub-modules shown in FIG. 2 may be combined or further partitioned as well. Inputs to the vehicle control module 12 may be sensed from the exhaust gas treatment system 11, received from other control modules, for example an engine control module (not shown), or determined by other sub-modules.

As illustrated in FIG. 2, the vehicle control module 12 according to at least one embodiment includes a memory 102, an entry condition module 104, a soot mass module 106, and a CRT compensation module 108. Each of the modules 104-108 interfaces and electrically communicates with the memory 102 to retrieve and update stored values as needed.

The memory 102 may store one or more threshold values, time periods over which the temperatures were measured a number of configurable limits, maps, data values, variables, and system models used to perform the regeneration operation. In at least one embodiment of the present disclosure, the memory 102 stores various parameters including, but not limited to, dvol, specific heat constants, and dimensions of the PF 24.

The entry condition module 104 may determine if one or more entry conditions exist based on one or more operating condition signals 200 output from one or more sensors of the vehicle. For example, the entry condition module 104 may compare operating conditions to one or more threshold values stored in the memory 102. Based on the comparison, the entry condition module 104 generates an entry condition signal 202 indicating that the entry conditions are satisfied.

The soot mass module 106 determines an amount (i.e., mass) of soot trapped in the filter substrate 30, and outputs a soot mass signal 211 indicating the soot mass. More specifically, pressure drop across a loaded after-treatment component (e.g., the PF 24) and data indicating the relationship between soot accumulation and pressure drop may be used to estimate the extent of soot loading in the filter substrate 30. Accordingly, the soot mass module 106 may store a soot mass model, which determines the soot mass based on $\Delta p$, Ts, $NO_{xRATE}$, and dvol. The $\Delta p$ is determined using a $\Delta p$ signal 204 output from the $\Delta p$ sensor 32. The Ts may be determined using one or more temperature signals 206 output from the fifth temperature sensor 42, and/or the sixth temperature sensor 44, and/or a temperature model. The $NO_{xRATE}$ is determined using a $NO_x$ signal 208 output from the $NO_x$ sensor 19. As mentioned above, dvol may be determined using $m_{Air}$ indicated by a mAir signal 210 output from the MAF sensor 16.

The CRT compensation module 108 is in electrical communication with the soot mass module 106 and receives a soot mass signal 211 indicating the soot mass of the filter substrate 30. The CRT compensation module 108 also receives a second Ts signal 212 indicating Ts, and the $NO_x$ signal 208. It is appreciated that the CRT compensation module 108 may receive the temperature signal 206 simultaneously with the soot mass module to determine Ts. Based on the soot mass, Ts and $NO_x$, the CRT compensation module 108 generates a CRT compensation value that modifies the soot model to compensate for variations in soot loading behavior.

The CRT compensation module 108 further determines a dynamic CRT threshold ($TH_{CRT}$) that varies as the soot mass on the filter substrate 30 changes. That is, the CRT compensation module 108 performs a dynamic CRT enablement operation by generating the CRT compensation value as a function of the changing soot mass stored on the filter substrate 30. The $TH_{CRT}$ may include a CRT threshold value, or a CRT threshold range defined by a lower threshold value and an upper threshold value. In at least one embodiment, the CRT threshold is based on a $NO_x$ concentration or a $NO_x$ flow rate indicated by the $NO_x$ signal 208. As the CRT threshold varies according to the soot mass, the CRT compensation module 108 compares the $NO_x$ signal 208 to $TH_{CRT}$. If the $NO_x$ signal 208 exists outside $TH_{CRT}$, the CRT compensation module 108 outputs a CRT compensation signal 214 to the soot mass module 106 indicating the CRT compensation value. The soot mass module 106 applies the CRT compensation value to the soot model to determine an updated soot mass accordingly. The soot mass module 106 may also generate an updated soot mass signal 216 indicating the updated soot mass.

Figure 3:
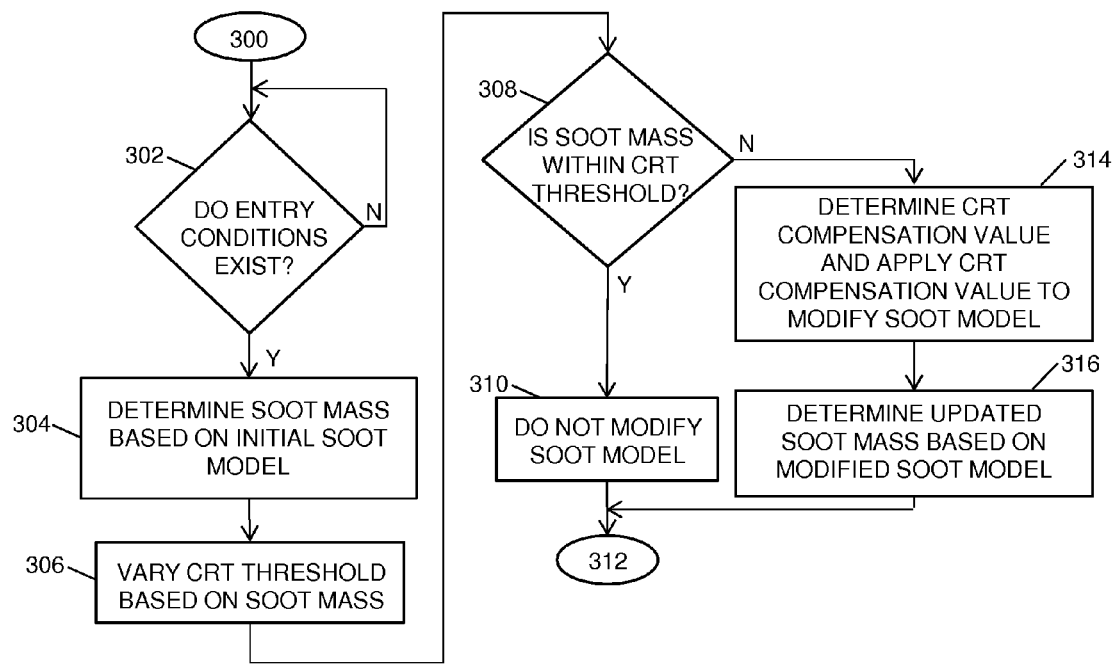
FIG. 3 is a flow diagram illustrating a method for dynamically enabling a CRT compensation operation to modify a soot model according to an exemplary embodiment of the present disclosure.

Turning now to FIG. 3, a method for dynamically enabling a CRT compensation operation to modify a soot model is illustrated according to an exemplary embodiment of the present disclosure. The method begins at operation 300, and proceeds to operation 302 to determine whether one or more entry conditions exist. If the entry conditions do not exist, the method returns to operation 302 and continues monitoring for entry conditions. If the entry condition exists, the method determines soot mass of a filter substrate included in a PF at operation 304. At operation 306, a variable CRT threshold is determined. The variable CRT threshold is based on, for example, a concentration of oxides of nitrogen ($NO_x$) in the exhaust gas, a $NO_x$ flow rate, and varies according the soot mass. At operation 308, the concentration of $NO_x$ and/or $NO_x$ flow rate is compared to the variable CRT threshold, which varies according to the soot rate as discussed above. If the concentration $NO_x$ and/or $NO_x$ flow rate is within the CRT threshold, the soot model is not modified (i.e., the CRT compensation operation is disabled) at operation 310, and the method ends at operation 312. However, if the $NO_x$ and/or $NO_x$ flow rate is not within the threshold, the CRT compensation operation is enabled at operation 314. The CRT compensation operation includes determining a CRT compensation value and applying the CRT compensation value to the soot model such that the soot model is modified. At operation 316, an updated soot mass is determined based on the modified soot model, and the method ends at operation 312.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust treatment system to treat exhaust gas of an internal combustion engine, the exhaust treatment system comprising:
    a particulate filter configured to trap soot contained in the exhaust gas flowing therethrough;
    a pressure sensor that outputs a pressure signal indicative of a pressure differential between an inlet of the particulate filter and an outlet of the particulate filter;
    a soot mass module including a microprocessor and electronic memory storing non-transitory computer readable instructions that when executed by the microprocessor, determines a soot mass indicative of an amount of soot stored in the particulate filter based on the pressure differential and a soot model stored in a memory device;
    a continuously regenerating trap (CRT) compensation module including a microprocessor and electronic memory storing non-transitory computer readable instructions that when executed by the microprocessor, generates a variable CRT threshold based on the soot mass and to selectively output a CRT compensation value that modifies the soot model based on a comparison between a NOx flow rate and the variable CRT threshold; and
    a particulate filer regeneration system configured to perform a regeneration operation that heats the particulate filter to combust the soot based on the modified soot model.

2. The exhaust treatment system of claim 1, wherein the CRT threshold continuously varies as the soot mass changes.

3. The exhaust treatment system of claim 2, wherein the CRT compensation module outputs the CRT compensation value when the soot mass is not within the CRT threshold.

4. The exhaust treatment system of claim 3, wherein the CRT threshold is based on one of a concentration of oxides of nitrogen ($NO_x$) in the exhaust gas or a $NO_x$ flow rate.

5. The exhaust treatment system of claim 4, wherein the CRT threshold includes a first threshold value and a second threshold value greater than the first threshold value, the first and second threshold values defining a CRT threshold range.

6. A hardware control module including a microprocessor and electronic memory storing non-transitory computer readable instructions that when executed by the microprocessor is configured to dynamically modify a soot model that indicates a soot mass stored on a particulate filter, the hardware control module comprising:
    an electronic memory device configured to store the soot model;
    a soot mass module including electronic memory storing non-transitory computer readable instructions that when executed by the microprocessor determines the soot mass based on the soot model and a pressure differential between an inlet and an outlet of the particulate filter; and
    a continuously regenerating trap (CRT) compensation module in electrical communication with the soot mass module, the CRT module including electronic memory storing non-transitory computer readable instructions that when executed by the microprocessor generates a CRT compensation value that modifies the soot model, and to generate a CRT threshold that varies as the soot mass stored in the particulate filter changes,
    wherein the hardware control module is configured to control a particulate filer regeneration system configured to perform a regeneration operation that heats the particulate filter to combust the soot mass based on the modified soot model.

7. The hardware control module of claim 6, wherein the CRT compensation module electrically communicates the CRT compensation value to the soot mass module based on a comparison between the soot mass and the CRT threshold.

8. The hardware control module of claim 7, wherein the CRT compensation module electrically communicates the CRT compensation value to the soot mass module when the soot mass is not within the CRT threshold.

9. The hardware control module of claim 8, wherein the soot model applies the CRT compensation value to the soot model to modify the soot model and determines an updated soot mass based on the modified soot model.

10. The hardware control module of claim 9, wherein the CRT threshold may include one of a CRT threshold value, or a CRT threshold range defined by a lower threshold value and an upper threshold value that is greater than the lower threshold value.

11. The hardware control module of claim 10, wherein the CRT threshold is based on the soot mass.

12. A method of controlling an exhaust treatment system of a vehicle, the method comprising:
    trapping soot contained in exhaust gas flowing through a particulate filter;
    determining a pressure differential between an inlet of the particulate filter and an outlet of the particulate filter;
    determining a soot mass indicative of an amount of soot stored in the particulate filter based on the pressure differential and a soot model;
    generating a CRT compensation value and a variable CRT threshold;

comparing the NOx flow rate to the CRT threshold;
selectively applying the CRT compensation value to the soot model such that the soot model is modified based on the comparison; and
regenerating the particulate filter to combust the soot stored on the particulate filter based on the modified soot model.

13. The method of claim 12, further comprising continuously varying the CRT threshold as the soot mass stored in the particulate filter changes.

14. The method of claim 13, further comprising applying the CRT compensation value when the soot mass is not within the CRT threshold.

15. The method of claim 14, further comprising generating the CRT threshold based on the soot mass.

16. The method of claim 15, wherein the CRT threshold includes a first threshold value and a second threshold value greater than the first threshold value, the first and second threshold values defining a CRT threshold range.

* * * * *